Figure 1:
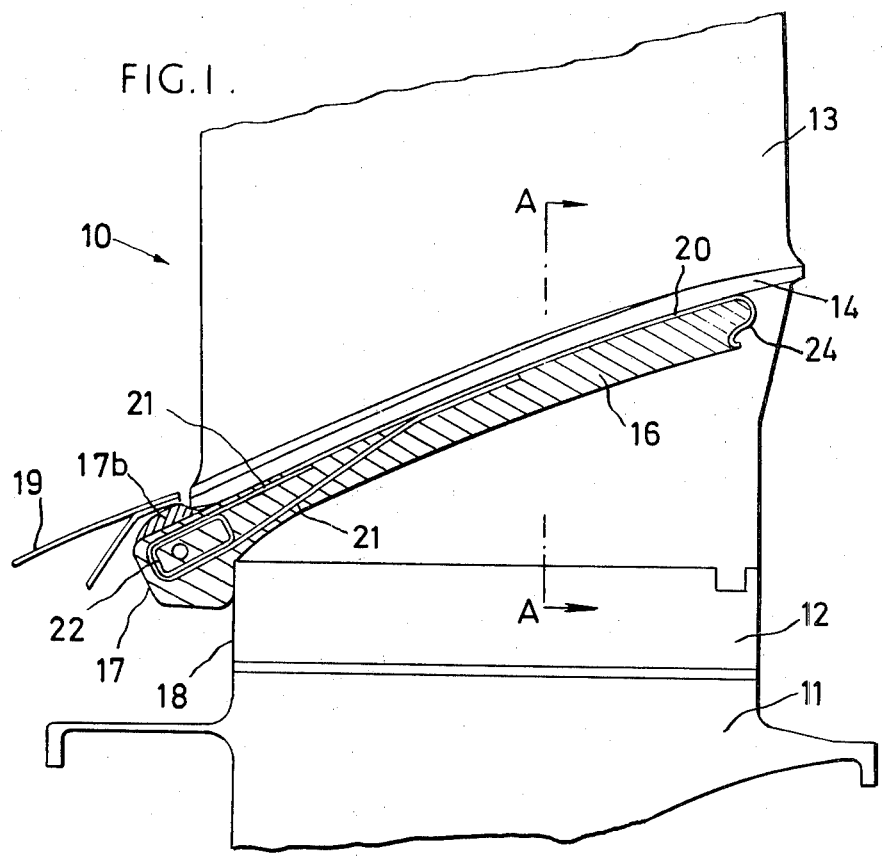

United States Patent [19]

Patterson et al.

[11] 4,177,013

[45] Dec. 4, 1979

[54] COMPRESSOR ROTOR STAGE

[75] Inventors: James Patterson, Allestree; Peter G. G. Farrar, Mickleover, both of England

[73] Assignee: Rolls-Royce Limited, London, England

[21] Appl. No.: 868,228

[22] Filed: Jan. 9, 1978

[30] Foreign Application Priority Data

Jan. 11, 1977 [GB] United Kingdom ................ 862/77

[51] Int. Cl.² ........................ F01D 5/22; F01D 5/10
[52] U.S. Cl. ............................ 416/193 A; 416/190;
      416/196 R; 416/500
[58] Field of Search ............... 416/193 A, 190, 191,
      416/196 R, 221, 500

[56] References Cited

U.S. PATENT DOCUMENTS

| 3,266,771 | 8/1966 | Morley | 416/196 X |
|---|---|---|---|
| 3,451,654 | 6/1969 | Johnson | 416/196 X |
| 3,905,722 | 9/1975 | Guy et al. | 416/193 A |
| 3,918,842 | 11/1975 | Longley et al. | 416/193 A X |
| 3,936,230 | 2/1976 | Helmintoller et al. | 416/196 R X |

FOREIGN PATENT DOCUMENTS

| 1079073 | 4/1960 | Fed. Rep. of Germany | 416/221 |
|---|---|---|---|
| 2166499 | 7/1974 | Fed. Rep. of Germany | 416/193 A |
| 1259750 | 1/1972 | United Kingdom | 416/193 A |
| 1457417 | 12/1976 | United Kingdom | 416/193 A |

Primary Examiner—Everette A. Powell, Jr.
Attorney, Agent, or Firm—Cushman, Darby & Cushman

[57] ABSTRACT

A rotor blade stage for a gas turbine engine comprises an annular array of aerofoil blades. Each blade is provided with circumferentially extending platforms which are arranged so as to circumferentially spaced apart from the platforms of adjacent blades. Elastomeric dampers are interposed between adjacent blades and are so adapted that upon rotation of the array of blades, each of the elastomeric dampers is centrifugally urged into engagement with the radially inner faces of adjacent platforms of adjacent blades.

8 Claims, 3 Drawing Figures

COMPRESSOR ROTOR STAGE

This invention relates to compressor rotor stages and in particular to the fan of a ducted fan gas turbine propulsion engine.

A gas turbine propulsion engine ducted fan usually comprises a number of aerofoil blades equi-angularly spaced around a central wheel or disc. It is sometimes found that the natural mechanical damping in such fan assemblies is insufficient to overcome the blade vibration which almost inevitably occurs during engine operation. When such vibration occurs it is usual to add some form of additional damping in order to raise the vibration frequency of the blades to such a level that vibration is substantially eliminated under normal engine operating conditions. It is with such additional damping that the present invention is concerned.

Vibration dampers have been proposed, for instance in British Patent No. 996,729, which are metallic. Such dampers rely on frictional contact with the vibrating blades in order to damp that vibration. However, despite rigorous manufacturing tolerances, it is extremely difficult to ensure that a large area of contact is achieved between the dampers and blades. Consequently high rates of wear occur in those regions where contact actually takes place, thereby resulting in short life blades and dampers.

It is an object of the present invention to provide a compressor rotor stage wherein the area of contact between the dampers and blades is increased.

According to the present invention, a rotor stage for a gas turbine engine comprises a rotor disc within which the root portions of an annular array of aerofoil blades are mounted, each of said blades being provided with circumferentially extending platforms spaced radially outwardly of said root portions and arranged so as to be circumferentially spaced apart from the platforms of adjacent blades, and a plurality of dampers made from an elastomeric material, each elastomeric damper being interposed between adjacent blades and adapted such that upon rotation of said disc, each of said elastomeric dampers is centrifugally urged into engagement with the radially inner faces of adjacent platforms of adjacent blades.

Preferably each of said elastomeric dampers is elongate and provided at one of its extents with an enlarged head portion, said head portion being adapted to locate against a radial face of said disc and adjacent platforms and roots of adjacent blades in such a manner that the remainder of said elastomeric damper is permitted to be centrifugally urged into engagement with said adjacent platforms but is constrained against movement in an axial direction.

Said elastomeric damper may be provided with at least one metallic portion which is adapted to engage said adjacent platforms, said at least one metallic portion being capable of deformation under centrifugal loading to conform to the contour of said radially inner faces of said adjacent platforms.

Said enlarged head portion of said elastomeric damper may be provided with at least one inlaid portion and these portions of said adjacent blades and said rotor disc against which said head portion locates.

Said enlarged head portion of said elastomeric damper may also be provided with at least one substantially rigid inlaid portion whereby deformation of said head portion under centrifugal loading is minimised.

Figure 2:
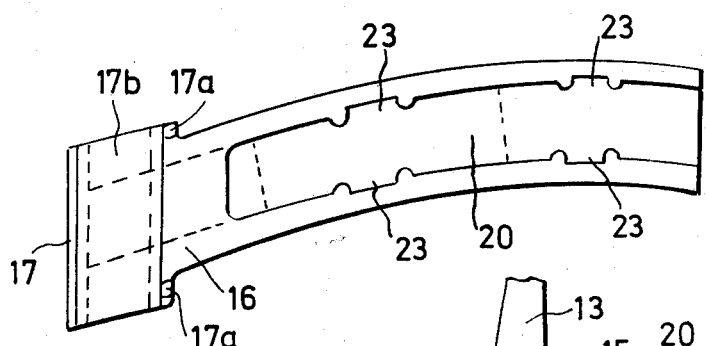
Figure 3:
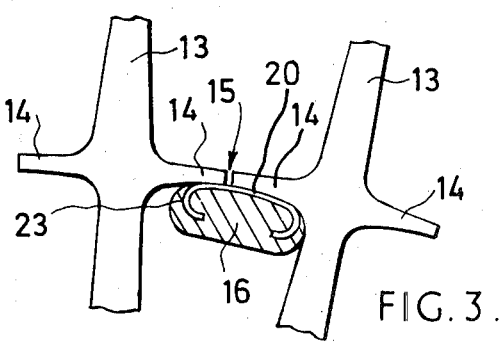

The invention will now be particularly described, merely by way of example, with reference to the accompanying drawings in which:

FIG. 1 is a partially sectioned side view of a portion of the fan of a ducted fan gas turbine engine, the fan being in accordance with the present invention, FIG. 2 is a plan view of the damper shown in FIG. 1, and FIG. 3 is a view on line A—A of FIG. 1.

With reference to the drawings, the fan 10 of a ducted fan gas turbine engine comprises a fan disc 11 within which are mounted the roots 12 of an annular array of fan blades 13. One fan blade 13 and its root 12, are shown in FIG. 1. Each of the fan blades 13 is provided with two similar circumferentially extending platforms 14 which are radially spaced apart from the blade root 12 and are inclined to the axis of rotation of the fan disc 11. A small gap 15 is provided between adjacent platforms 14 of adjacent fan blades 13 in order to permit a limited degree of independent vibrational movement of each fan blade 13.

Damping of such vibrational movement of the fan blade 13 is provided by a plurality of silicone rubber elastomeric dampers 16, one of which can be seen in the drawings. Each elastomeric damper 16 is located between adjacent fan blades 13 and below the platforms 14, is elongate, and is provided with an enlarged head portion 17. The damper head portion 17 is shaped so as to engage both the front face 18 of the fan disc 11 and the root and platform regions of the fan blades 13. Consequently the head portion 17 constrains any tendency of the elastomeric damper 16 to move in an axial direction as a result of the centrifugal loading imposed upon it when the fan disc 11 is rotated. It will be appreciated however, that despite the constraint exerted by the enlarged head portion 17, the elastomeric damper 16 will have a tendency to stretch in an axial direction as a result of its elastic properties.

In addition to constraining the elastomeric damper 16, the enlarged head portion 17 also provides an air seal between the fan blade 13 and the nose cone 19, a portion of which can be seen in FIG. 1. The enlarged head portions 17 are shaped so that together they define an annulus thereby providing a fully annular air seal between the fan blades 13 and nose cone 19.

The head portion 17 of the elastomeric damper 16 is provided with two inlaid portions 17a which are adapted to resits fretting between the head portion 17 and the front face 18 of the fan disc 11 and the root and platform regions of the fan blades 13. The inlaid portions 17a are formed from a PTFE impregnated linen marketed under the name "Fibreship" by Ampep Limited. The head portion 17 is also provided with a further inlaid portion 17b which is adapted to abut the nose cone 19. The inlaid portion 17b is formed from a carbon fibre reinforced epoxy resin so as to provide a support which tends to resist deformation of the head portion 17 under centrifugal loading.

Each elastomeric damper 16 is for such a width as to span the radially inner faces of adjacent platforms 14 of adjacent fan blades 13 (FIG. 3). Thus upon rotaton of the fan disc 11, each elastomeric damper 16 is urged by centrifugal loading into engagement with adjacent platforms 14. Consequently any vibrational movement of the fan blades 13 will be directly transmitted to the elastomeric dampers 16 where such vibration will be damped.

In order to reduce any frictional wear which may occur between the elastomeric damper 16 and the platform 14, a thin steel sheet 20 is moulded into the platform contacting surface of the elastomeric damper 16. The sheet 20 is retained in position by a steel reinforcing member 21 which in turn attached to a steel box member 22, the members 21 and 22 being moulded within the elastomeric damper 16. Four curved regions 23 of the sheet 20 also assist in retaining it in position on the elastomeric damper 16. One end 24 of the sheet 20 is curved around the unsupported end of the elastomeric damper 16 in order to restrict any axial stretching of the damper under centrifugal loading.

Since the steel sheet 20 is thin, it is capable of deforming under centrifugal loading by the elastomeric damper so as to conform to the contours of the two adjacent platforms 14 which it engages. Consequently a higher contact area is achieved than would be the case with an all metal damper.

Although the present invention has been described with reference to dampers 16 provided with steel engagement sheets 20, it will be appreciated that in certain circumstances, such sheets may not in fact be required. Thus for instance, they may not be necessary if very little rubbing is expected between the damper 16 and platforms 14.

The elastomeric damper 16 may be manufactured from any elastomeric material which is suitable for the environmental conditions which it is likely to encounter in service. Thus whilst the present invention has been described with reference to a damper manufactured from a silicone rubber, it will be appreciated that if lower temperatures are expected such a material as an elastomeric polyurethane resin could be utilized.

We claim:

1. A rotor stage for a gas turbine engine comprising:
    a rotor disc;
    an annular array of aerofoil blades, each of said aerofoil blades being provided with a root portion adapted to locate in said rotor disc and circumferentially extending platforms spaced radially outwardly of said root portion and arranged so as to be circumferentially spaced apart from platforms of adjacent blades; and
    a plurality of elongated dampers made from an elastomeric material, each of said elastomeric dampers having an enlarged head portion at one of its extents, said enlarged head portion being located against a radial face of said rotor disc and against adjacent platform and roots of adjacent blades in such a manner that the remainder of said elastomeric damper is permitted to be circumferentially urged into engagement with said platforms but is constrained against movement in an axial direction, said enlarged head portion of each damper being further provided with an inlaid portion arranged to resist fretting between the head portion and the platform and root portions of said adjacent blades and against the radial face of said rotor disc.

2. A rotor stage for a gas turbine engine as claimed in claim 1 wherein each of said elastomeric dampers is provided with at least one metallic portion which is adapted to engage said adjacent platforms, said at least one metallic portion being capable of deformation under centrifugal loading to conform to the contour of said radially inner faces of said adjacent platforms.

3. A rotor stage for a gas turbine engine as claimed in claim 1 wherein said enlarged head portion of said elastomeric damper is provided further with at least one substantially rigid inlaid portion whereby deformation of said head portion under centrifugal loading is minimised.

4. A rotor stage for a gas turbine engine as claimed in claim 1 wherein there are at least two inlaid portions circumferentially spaced apart and adapted to resist fretting between said head portion and the platform and root portions of adjacent blades and against the radial face of said rotor disc.

5. A rotor stage for a gas turbine engine comprising:
    a rotor disc;
    an annular array of aerofoil blades, each of said aerofoil blades being provided with a root portion adapted to locate in said rotor disc and circumferentially extending platforms spaced radially outwardly of said root portion and arranged so as to be circumferentially spaced apart from platforms of adjacent blades; and
    a plurality of elongated dampers made from an elastomeric material, each of said elastomeric dampers having an enlarged head portion at one of its extents, said enlarged head portion being located against a radial face of said rotor disc and against adjacent platform and roots of adjacent blades in such a manner that the remainder of said elastomeric damper is permitted to be circumferentially urged into engagement with said platforms but is constrained against movement in an axial direction, said enlarged head portion of each damper being further provided with at least one substantially rigid inlaid portion to minimize deformation of said head portion when said damper is under centrifugal loading.

6. A rotor stage for a gas turbine engine as claimed in claim 5 wherein said enlarged head portion of said elastomeric damper is further provided with at least a pair of circumferentially spaced inlaid portions arranged to resist fretting between the head portion and the platform and root portions of said adjacent blades and against the radial face of sawd rotor disc.

7. A rotor stage for a gas turbine engine as claimed in claim 6 wherein each of said elastomeric dampers is provided with at least one metallic portion which is adapted to engage said adjacent platforms, said at least one metallic portion being capable of deformaation under centrifugal loading to conform to the contour of said radially inner faces of said adjacent platforms.

8. A rotor stage for a gas turbine engine as claimed in claim 6 wherein said rigid inlaid portion is formed from a carbon fiber reinforced epoxy resin.

* * * * *